Jan. 13, 1959     G. E. HANSEN ET AL     2,868,460
TEMPERATURE AND PRESSURE RELIEF VALVE ASSEMBLY
Filed Jan. 17, 1956
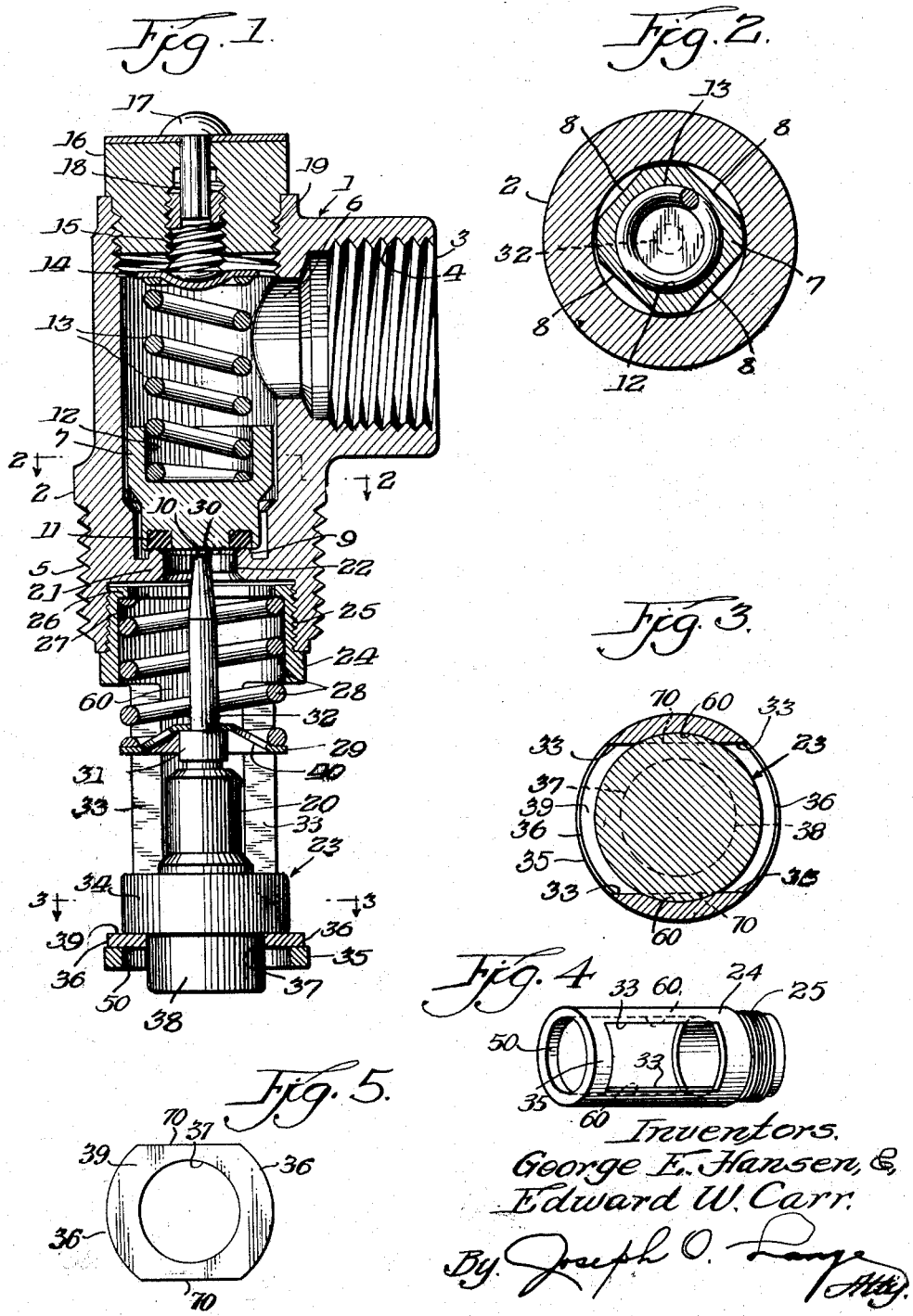
Inventors,
George E. Hansen &
Edward W. Carr.
By Joseph O. Lange
Atty.

United States Patent Office 2,868,460
Patented Jan. 13, 1959

2,868,460

TEMPERATURE AND PRESSURE RELIEF VALVE ASSEMBLY

George E. Hansen, Elmwood Park, and Edward W. Carr, Cicero, Ill., assignors to Crane Co., Chicago, Ill., a corporation of Illinois Application January 17, 1956, Serial No. 559,618

6 Claims. (Cl. 236—92)

This invention relates to a combined temperature and pressure relief valve assembly, and more particularly, it is concerned with a novel form of valve structure in which a significant portion of the critical assembly is conveniently removable as a unit. Heretofore, the inability of the industry to provide an economical and conveniently removable thermal unit has been the source of considerable expense to the trade.

Therefore, an object is to provide for a construction in which the temperature responsive element together with the valve closure member can be easily attached or removed from the valve as a separate unit.

A further object is to provide for a structure which permits of independent and complete testing of the unit containing the temperature responsive unit on a production basis without the necessity for having the value itself mounted on the test line.

Other objects and advantages of this invention will become more readily apparent upon proceeding with the specification read in light of the accompanying drawings, in which Fig. 1 is a sectional assembly view of a valve embodying our invention.

Fig. 2 is a fragmentary sectonal view taken on the line 2—2 of Fig. 1.

Fig. 3 is a fragmentary sectional view taken on the line 3—3 of Fig. 1.

Fig. 4 is a perspective view of the novel sleeve of our invention.

Fig. 5 is a plan view of the washer for cooperation with said sleeve.

Similar reference numerals refer to similar parts throughout the several figures.

Referring now to Fig. 1, a valve body or casing generally designated 1 is shown having the usual inlet shank 2 and the outlet 3 provided with threads at 4 and 5 respectively for effecting fluid sealing attachment to the usual pipe line (not shown). The valve casing comprises a chamber 6 for receiving a closure member 7, the latter being preferably of polygonal cross section as indicated at 8 in Fig. 2 to allow for the flow of fluid around and therepast when the closure member is unseated as hereinafter described. At the lower portion of the valve chamber 6, an annular seat 9 is provided for normally receiving in fluid sealing relation the contact member 11 on the closure member 7. Depending upon the type of service for which the valve is to be employed, the seat ring 11 may be dispensed with and the closure member 7 provided instead with an integral seat contact portion.

Within the closure member 7, a recess 12 receives a coil spring 13, while at the upper end portion thereof a spring washer 14 is placed in abutting contact as indicated with the upper end of the spring and held under suitable compression by means of the threaded adjusting screw 15 threadedly received with the cap 16 and preferably, but not necessarily, covered by a capped plug 17 polygonally engaging the threaded member 15 as at 18 to discourage tampering and thereby holding the spring under the desired compression load. As thus far described, the valve is of the usual order of a water relief valve and is made with the precision machining governing this type of valved device.

The capped member 16 is threadedly or otherwise held in position by means of the threaded shank at 19. The valve seat 9 preferably comprises an inwardly extending annular extension 21 ported as at 22 for the entry of fluid passing therethrough. For purpose of providing a closure member unseating mechanism in reaction to high temperatures, a thermostatically responsive device is employed, such as the type identified by the trademark "Vernatherm," made and sold by Detroit Lubricator Co., Detroit, Michigan, and generally designated 23. It consists of a body 20, an attaching collar 31, and the stem or plunger 32. The latter elements upon exposure of the device 23 to predetermined high temperatures will expand longitudinally to contact at 10 the undersurface 30 of the closure 7 thereby to raise the latter from the seat 9.

The lower threaded shank or inlet 5 of the casing receives the depending sleeve member 24 which is threadedly attached as at 25 to the said casing shank. At its innermost end portion, the sleeve 24 is provided with an inwardly extending annular shoulder 26 forming the opening 27. Upon the latter shoulder, the coiled spring 28 is supported at its upper portion and at its lower end against the spring washer 29. The latter member is fitted over the stem 32 and rests upon the collar 31 of the reciprocally movable stem or plunger 32.

From the standpoint of appreciating the convenience and economy in the structure, it will be understood that the lower reduced end of the depending sleeve 24 is transversely aperted as at 33 to receive the thermally responsive unit 23 upon suitably compressing the spring 28. An enlarged portion 34 of the said unit is supported over the apertured end of the sleeve as at 35 by having interposed therebetween the lock washer 36 with flattened sides 70 and of the general configuration shown in Fig. 3. The washer 36 is relatively snugly fitted as at 37 around the lower end projection 38 of the thermally responsive member 23, and is of said side flattened configuration to fit non-rotatably between the oppositely disposed vertical surfaces 33 of the depending bifurcated portion of the sleeve 24. The enlarged lower portion 38 projects through the open end 50 of the sleeve at 35, and over which opening 50 the washer 36 lies, as illustrated. It will be clear that the peripheral portion 34 of the unit 23 is snugly guided by the oppositely disposed curved walls 60 as shown more clearly in Fig. 3 and said portion 38 is closely fitted in the aperture 37 of the washer 36.

It will be understood therefore that by merely forcing the thermostatic element upwards against the tension of the spring 28 so that the portion 38 clears the upper surface 39 of the washer 36, the said washer is then moved sideways relative to the oppositely disposed surfaces 33 and after clearing the latter, such members as the coil spring 28, washer 29 and the complete thermal assembly 23 may be either inserted or removed as a unit, being inserted or dropped out through the central aperture of the portion 35 respectively, without the necessity for disassembling or disturbing the valve and its spring element and the assemblies on the upper side of the valve seat 21. It will be appreciated that the diameter of portion 34 of the thermal unit 23 is slightly smaller than the aperture in the sleeve 35 immediately below the washer 36 to permit of said insertion or removal of the unit and said members 28 and 29. The oppositely disposed arcuate surfaces 60 aid in centering and holding the thermal member 23 firmly in position and centering same in the course of valve operation. Preferably the radius of arcuate wall surfaces 60 is the same as for the lower opening 50, thus to provide a smooth unbroken interior wall surface except for openings 33.

It will be further understood that with such removability or attachment of the complete assembly unit of the said thermally responsive element with the closure member as a separate self-contained unit the complete testing of the unit such as the degree of response or sensitivity and on a production scale basis can now be accomplished without having the valve itself in the latter assembly. For example, it has been found that this construction permits the temperature responsive unit to be inserted in water on a conveyor built with suitable gaging such as "go" and "no go" gages that quickly and automatically disclose the nature of the piston travel of the member 32 in relation to the water temperature involved.

It will be further understood that the lower end limit 38 of the thermostatic element 23 is moved upward and inward with relation to the cage opening 50 at the lower portion 35 so that the spring 28 is suitably compressed. This amount of movement will thus permit the thermal unit to clear the upper surface 39 of the washer 36 to allow the washer 36 to be moved transversely through either of the side openings provided by the spaced-apart surfaces 33 (see Fig. 3) of the sleeve or cage member 24 and thereby to facilitate the dropping out of or the insertion of the members 23, 28 and 29 as hereinabove referred to.

In summary, it will be understood that the structure provides for the desirable function of easy and quick removability of the thermal element independent of the valve itself. The washer 36 functions as a frictional locking mechanism and as a retaining member to keep the internal working parts concentric with the closure member 7 of the valve. It also enables making the sleeve member 24 economically from ordinary tubing and to permit punching the slots therefrom to form the surfaces 33 forming a depending bifurcated portion of said sleeve for retaining the washer in non-rotative position relative to the sleeve.

In the operation of the valve, it will be further understood that use is preferably made of a temperature responsive element which is highly sensitive to temperature variations so that the movement of the combined plunger and stem member 32 is accomplished by the simple expansion of a suitable fluid within the body portion 20 of the temperature element 23 and thereby raise the valve disk from its seat by contact of the reduced end portion 10 with the undersurface 30 of the closure member 7. It will be apparent that the stem member 32 moves against the force of the coil spring 28 which compels the return movement of the plunger or stem 32 and thus resets the thermostatic materials within the elements to their original condition as the temperature of the water or other liquid drops within the tank or pipe line upon which the valve device is mounted.

It will further be clear that while only a single embodiment has been shown and described, the device is capable of embodiment in other forms of construction without departing from the spirit of the invention as defined by the appended claims.

We claim:

1. In a thermostatic relief valve, the combination of a casing, a closure member therefor, a temperature responsive element cooperating with the said closure member, means for attaching the said temperature responsive element to the valve casing, the latter means comprising a depending sleeve member having transversely extending apertures, the lower limits of the said apertures being defined by an inwardly extending abutment for supporting the temperature responsive element, a plate-like washer engaging a shoulder projecting portion of the temperature responsive element and having formed side portions slidably engaging the apertures of said sleeve member to permit the insertion and removal of said washer through either of said sleeve apertures, the said sleeve member having a lower central aperture for insertion and removal of the thermal unit whereupon when moving the said temperature responsive element axially so that the projecting portion thereof is above the said washer the latter washer is then removable sidewise through either of said sleeve apertures.

2. In a thermostatic relief valve, the combination of a casing, a reciprocally movable closure member therefor normally seated in the casing, a temperature responsive element cooperating with the said closure member to move the latter member predeterminately from its normally seated position within said casing, means for attaching the said temperature responsive element to the valve casing, the latter means comprising a depending sleeve member having transverse through extending apertures, the lower limits of the said sleeve apertures being defined by a substantially circular end abutment for supporting thereon an enlarged portion of the said temperature responsive element, an interposed washer supported by the abutment and engaging an undersurface portion of the enlarged portion of the temperature responsive element, the apertures of said sleeve member forming oppositely disposed wall openings permitting the insertion and removal of said washer from either side of said sleeve member apertured portions, the said sleeve member at its lower limit having a central aperture for effecting insertion and removal of the said temperature responsive element following said sidewise removal of said washer from the sleeve member apertures.

3. In a thermostatic relief valve, the combination of a casing with an inlet and outlet portion, a closure member therefor, a temperature responsive element cooperating with the said closure member, means for attaching the said temperature responsive element to the inlet portion of the valve casing, the latter means comprising a sleeve member with a depending portion having a transversely extending aperture means, the lower limit of the said aperture means being defined by an annularly disposed abutment for supporting the temperature responsive element against axial movement, a washer interposed between the temperature responsive element and the said abutment engaging a reduced shoulder portion of the temperature responsive element to support the latter element upon the said abutment, the aperture means of said sleeve member being of a width at least sufficient to permit the slidable insertion and removal therethrough of reduced portion of said washer, the said sleeve member above said abutment being formed to snugly receive said temperature responsive element in guiding and positioning the latter element within a lower portion of the said sleeve member.

4. In a thermostatic relief valve, the combination of a casing, a closure member therefor, a temperature responsive element cooperating with the said closure member, means for attaching the said temperature responsive element to the valve casing, the latter means comprising a sleeve member of substantially hollow cylindrical form except for a cut-away portion forming at least one transversely extending aperture in a side wall thereof, the lower limits of the said aperture being substantially defined by an inturned apertured portion for receiving the temperature responsive element, a non-rotatably mounted washer overlying the inturned portion to support the said temperature responsive element, the aperture of the inturned portion of said cage member being of a diameter larger than the temperature responsive element to permit the insertion and removal of said temperature responsive element from the lower end of the sleeve upon displacement laterally of said washer beyond the side wall aperture.

5. In a thermostatic relief valve, the combination of a valve casing, a reciprocally movable resiliently biased closure member seated therewithin, a temperature responsive element cooperating with the said closure member to predeterminately unseat the closure member, means for attaching the said temperature responsive element to the valve casing, the latter means comprising a sleeve member having transversely extending apertured depending portion, the lower limits of the apertured depending portion forming an end disposed means for supporting the said temperature responsive element, a washer having oppositely disposed flattened side portions, the said washer engaging an undersurface of the temperature responsive element and being non-rotatably mounted relative to the sleeve member, the apertured portion of said sleeve member being defined by spaced-apart end walls in a vertical plane having a distance therebetween not less than the width of the said washer across its flattened side portions whereby to hold the washer against rotation while permitting the insertion and removal of said washer upon predetermined axial movement of the temperature responsive element in a direction towards the valve casing and closure member.

6. In a thermostatic relief valve, the combination of a valve casing, a closure member, a temperature responsive element cooperating with the said closure member, means for attaching the said temperature responsive element to the valve casing, the latter means comprising a sleeve member having transversely extending apertures and an end apertured portion, the lower limits of the said transversely extending apertures being defined by an annular abutment comprising a ported flange for supporting the temperature responsive element, a washer on the annular abutment spanning the ported flange and engaging a depending projection on the temperature responsive element in a plane above the inner limits of the ported flange, the transverse apertures of said sleeve member being oppositely disposed to facilitate the insertion and removal of said washer from either aperture upon predetermined axial movement upwardly of the said temperature responsive element so as to disengage the washer from the depending projection of the temperature responsive element and laterally move the washer through either of the transversely extending apertures out of the path of axial movement of the temperature responsive element.

References Cited in the file of this patent
UNITED STATES PATENTS

| | | |
|---|---|---|
| 2,258,696 | Betz et al. | Oct. 14, 1941 |
| 2,598,351 | Carter | May 27, 1952 |
| 2,634,057 | Hoffman | Apr. 7, 1953 |
| 2,740,586 | Cahniot | Apr. 3, 1956 |